US011900846B2

(12) United States Patent
Xia et al.

(10) Patent No.: US 11,900,846 B2
(45) Date of Patent: Feb. 13, 2024

(54) CHROMINANCE VISUAL ANGLE CORRECTION METHOD FOR DISPLAY, AND INTELLIGENT TERMINAL AND STORAGE MEDIUM

(71) Applicant: SHENZHEN TCL NEW TECHNOLOGY CO., LTD., Guangdong (CN)

(72) Inventors: Daxue Xia, Guangdong (CN); Lin Chen, Guangdong (CN); Renli Xie, Guangdong (CN)

(73) Assignee: SHENZHEN TCL NEW TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 17/757,075

(22) PCT Filed: Sep. 4, 2020

(86) PCT No.: PCT/CN2020/113359
§ 371 (c)(1),
(2) Date: Jun. 8, 2022

(87) PCT Pub. No.: WO2021/114760
PCT Pub. Date: Jun. 17, 2021

(65) Prior Publication Data

US 2023/0005406 A1 Jan. 5, 2023

(30) Foreign Application Priority Data

Dec. 9, 2019 (CN) ......................... 201911250957.0

(51) Int. Cl.
*G09G 3/20* (2006.01)

(52) U.S. Cl.
CPC ... *G09G 3/2003* (2013.01); *G09G 2300/0452* (2013.01); *G09G 2320/028* (2013.01); *G09G 2320/0242* (2013.01); *G09G 2360/16* (2013.01)

(58) Field of Classification Search
None
See application file for complete search history.

(56) References Cited

U.S. PATENT DOCUMENTS

2007/0013633 A1* 1/2007 Kamada ................ G02F 1/1362 345/98
2010/0156774 A1* 6/2010 Broughton ........... G09G 3/3648 345/88

(Continued)

FOREIGN PATENT DOCUMENTS

CN 101364401 A 2/2009
CN 102568429 A 7/2012

(Continued)

OTHER PUBLICATIONS

Written Opinion of the International Search Authority in international application No. PCT/CN2020/113359, dated Dec. 1, 2020.

(Continued)

*Primary Examiner* — Patrick N Edouard
*Assistant Examiner* — Peijie Shen
(74) *Attorney, Agent, or Firm* — PV IP PC; Wei Te Chung; Zhigang Ma

(57) ABSTRACT

The present application provides a chrominance visual angle correction method for a display, and an intelligent terminal and a storage medium. The method comprises: acquiring brightness data of different primary colors varying with the gray scale at a vertical visual angle and a squint visual angle, and generating a search database; splitting, according to the search database and a preset rule, a pixel gray scale of the display into a plurality of high and low gray scale combi- (Continued)

nations composed of high gray scales and low gray scales; calculating a scale of brightness of the plurality of high and low gray scale combinations, and acquiring a scale of brightness of high and low gray scale combination closest to a scale of vertical vision brightness as a primary color pixel gray scale.

14 Claims, 2 Drawing Sheets

(56) References Cited

U.S. PATENT DOCUMENTS

| | | | | |
|---|---|---|---|---|
| 2013/0088528 | A1* | 4/2013 | Borgers | G09G 3/3648<br>345/690 |
| 2014/0009483 | A1* | 1/2014 | Liu | H04N 13/341<br>345/589 |
| 2016/0202758 | A1* | 7/2016 | Peana | G06F 3/013<br>345/601 |
| 2016/0247296 | A1* | 8/2016 | Chen | G09G 3/2074 |
| 2018/0174535 | A1* | 6/2018 | Chen | G09G 3/3611 |
| 2018/0330680 | A1* | 11/2018 | Chen | G09G 3/3607 |
| 2019/0086702 | A1* | 3/2019 | Chen | G09G 3/3648 |
| 2019/0114978 | A1* | 4/2019 | Chen | G02F 1/13452 |
| 2019/0221173 | A1* | 7/2019 | Lee | G02F 1/1323 |
| 2019/0325831 | A1* | 10/2019 | Chen | G09G 3/3607 |
| 2019/0325837 | A1* | 10/2019 | Chen | G09G 3/3607 |
| 2020/0118513 | A1* | 4/2020 | Chen | G09G 3/3696 |
| 2020/0184911 | A1* | 6/2020 | Chen | G09G 3/3688 |
| 2021/0327375 | A1* | 10/2021 | Kang | G09G 3/3648 |
| 2022/0392390 | A1* | 12/2022 | Lee | G09G 3/2074 |

FOREIGN PATENT DOCUMENTS

| | | | | |
|---|---|---|---|---|
| CN | 104166258 | A | 11/2014 | |
| CN | 104599656 | A | 5/2015 | |
| CN | 109326264 | A | 2/2019 | |
| WO | 2012023922 | A1 | 2/2012 | |
| WO | WO-2013127092 | A1 * | 9/2013 | G09G 3/36 |
| WO | WO-2016131216 | A1 * | 8/2016 | G09G 3/2003 |

OTHER PUBLICATIONS

International Search Report in International application No. PCT/CN2020/113359, dated Dec. 1, 2020.

* cited by examiner

CHROMINANCE VISUAL ANGLE CORRECTION METHOD FOR DISPLAY, AND INTELLIGENT TERMINAL AND STORAGE MEDIUM

CROSS REFERENCE TO RELATED APPLICATION

This application is a US national phase application based upon an International Application No. PCT/CN2020/113359, filed on Sep. 4 2020, which claims the priority of Chinese Patent Application No. 201911250957.0, filed on Dec. 9, 2019, application name "CHROMINANCE VISUAL ANGLE CORRECTION METHOD FOR A DISPLAY, AND AN INTELLIGENT TERMINAL AND A STORAGE MEDIUM". The entire disclosures of the above applications are incorporated herein by reference.

FIELD OF THE DISCLOSURE

The present disclosure relates to a technical field of display processing, and more particularly, to a chrominance visual angle correction method for a display, and an intelligent terminal and a storage medium.

BACKGROUND

Nowadays, electronic products such as mobile phones, televisions, computers, and commercial displays are widely used in all aspects of industrial production and life. With development of display technology and popularization of display panels, application scenarios of display panels are gradually increasing, wide visual angle and high picture quality characteristics of the display panels have a higher requirement in order to achieve a best viewing experience.

For example, the primary color pixel of a television is composed of red/green/blue (RGB) gray scales; the gray scale is 0-255; and each gray scale has its corresponding brightness. Display of all colors in a television is mixed by these RGB gray scales. RGB has a mixing scale at a vertical angle, but due to factors such as the performance of a display itself, a scale of brightness of RGB changes at a squint visual angle, resulting in color deviation.

A chrominance visual angle is an important indicator to measure performance of the display panel. Due to directionality of color display on the screen, colors of a picture change with visual angles. When the color changing causes the color difference=0.02, an angle is a color visual angle. When the chrominance visual angle is larger, the visual angle of the display panel is also larger so that viewing experiences from different angles are better. At present, there are many ways to improve the chrominance visual angle of the display panels in industry, among which the main methods are: polarizer process and function optimization, RGB pixel array partitioning, etc. These methods can achieve improvement of the chrominance visual angle to a certain extent, but a corresponding performance of other aspects of the display panel is sacrificed, such as increasing cost and process difficulty. Polarizer treatment on a television surface affects brightness; changing pixel array can change the backlight area and transmittance, etc.; and a range of improvement with the chrominance visual angle is limited. It is difficult to match requirements of some large visual angle and specific scenario.

Therefore, prior art technology needs to be improved and developed.

SUMMARY

A main object of the present disclosure comprises to provide a chrominance visual angle correction method for a display, and an intelligent terminal and a storage medium, which aim to solve the problem when improving the chrominance visual angle in the prior art, it is necessary to sacrifice other performance of the display panel, the degree of improvement of the chrominance visual angle is limited, and which is difficult to match the viewing requirements of the large visual angle and the specific scenario.

In order to realize above object, the present disclosure provides a chrominance visual angle correction method for a display, comprises steps below:

acquiring data of the brightness of different primary colors varying with a gray scale at a vertical visual angle and a squint visual angle, and generating a search database;

splitting a pixel gray scale of the display into a plurality of high and low gray scale combinations composed of high gray scales and low gray scales according to the search database and a preset rule; and calculating a scale of brightness of the plurality of high and low gray scale combinations, and acquiring a high and low gray scale combination that is closest to a scale of vertical vision of brightness as a primary color pixel gray scale.

Optionally, the chrominance visual angle correction method for the display, wherein, before the step of acquiring the data of the brightness of different primary colors varying with the gray scale at the vertical visual angle and the squint visual angle, and generating the search database, further comprises:

acquiring brightness data of primary color pixel gray scales at the vertical visual angle and the squint visual angle separately; the vertical visual angle being a direction in which the user and the display are facing directly, and the squint visual angle being a direction in which there is a preset angle difference between a facing direction of the user and the display.

Optionally, the chrominance visual angle correction method for the display, wherein, the search database comprises a database of the brightness of primary color at the vertical visual angle and a database of the brightness of primary color at the squint visual angle.

Optionally, the chrominance visual angle correction method for the display, wherein, the preset rule is that the brightness of the pixel gray scale of the display before splitting and after splitting does not change.

Optionally, the chrominance visual angle correction method for the display, wherein, according to the search database and the preset rule, splitting the pixel gray scale of the display into the plurality of high and low gray scale combinations composed of high gray scales and low gray scales, specially comprises:

splitting the pixel gray scale of the display into a plurality of high and low gray scale combinations composed of high gray scales and low gray scales according to the database of the brightness of primary color at the vertical visual and the brightness of the pixel gray scale of the display unchanged before splitting and after splitting;

each of the high and low gray scale combinations comprising a high gray scale and a low gray scale; and a sum of the brightness of the high gray scale and the low gray scale in each of the high and low gray scale combination is same as the brightness of the pixel gray scale of the display.

Optionally, the chrominance visual angle correction method for the display, wherein, the pixel gray scale of the display indicates that each pixel of the display is composed of three primary color gray scales of R/G/B.

Optionally, the chrominance visual angle correction method for the display, wherein, a splitting rule of the gray scale comprises gradually adding a preset value to the gray scale value for splitting.

Optionally, the chrominance visual angle correction method for the display, wherein, the calculating the scales of brightness of the plurality of the high and low gray scale combinations, and acquiring a high and low gray scale combination that is closest to the scale of vertical visual brightness as the primary color pixel gray scale, specifically comprising:

calculating the scale of brightness of the plurality of the high and low gray scale combinations according to the database of the primary color brightness of squint visual angle;

acquiring a high and low gray scale combination that is closest to the scale of vertical visual brightness among the plurality of the high and low gray scale combinations as the primary color pixel gray scale; and writing the primary color pixel gray scale into the display.

Optionally, the chrominance visual angle correction method for the display, wherein, the sum of the brightness of the high and low gray scale combinations is equal at the vertical visual angle, a scale of brightness of RGB is equal, and the sum of the brightness the high and low gray scale combinations and the scale of brightness of RGB changes at the squint visual angle.

Optionally, the chrominance visual angle correction method for the display, wherein, the scale of brightness is a ratio of the scale of brightness R/G/B at the vertical visual angle before splitting to a sum of brightness of high and low gray scale R/G/B at the squint visual angle after splitting.

Optionally, the chrominance visual angle correction method for the display, wherein, the chrominance visual angle correction method for the display further comprises:

the brightness data of the search database is collected at every preset size of the gray scale; or the brightness data of the search database is obtained by acquiring part of the brightness data and performing data fitting.

Optionally, the chrominance visual angle correction method for the display, wherein, when the preset angle difference is greater than 0° and less than 90°, it is defined as the squint visual angle.

Optionally, the chrominance visual angle correction method for the display, wherein, the display comprises: LCD, OLED, QLED and micro-LED.

In addition, in order to achieve the above object, the present disclosure also provides an intelligent terminal, wherein the intelligent terminal comprises: a memory, a processor, and a chrominance visual angle correction program for a display stored in the memory and running on the processor, when the chrominance visual angle correction program for the display is executed by the processor, it implements steps of the above-mentioned chrominance visual angle correction method for the display.

In addition, in order to achieve the above object, the present disclosure also provides a storage medium. Wherein, the storage medium stores a chrominance visual angle correction method for a display, and the chrominance visual angle correction method is executed by a processor to implement steps of the chrominance visual angle correction method as described above.

In the present disclosure, acquire data of the brightness of different primary colors varying with the gray scale at the vertical visual angle and the squint visual angle, and generate the search database; split, according to the search database and the preset rule, the pixel gray scale of the display into the plurality of high and low gray scale combinations composed of high gray scales and low gray scales; and calculate the scale of brightness of the plurality of high and low gray scale combinations, and acquire the high and low gray scale combination the scale of brightness of which is closest to the scale of vertical vision brightness as the primary color pixel gray scale. By means of making primary colors have the same scale of brightness at the vertical visual angle and the squint visual angle, the chrominance visual angle of the display is improved, such that the squint visual angle can be improved without changing the performance at the vertical visual angle, thereby greatly improving a viewing effect of the display at the squint visual angle, and facilitating a large-visual-angle application scenario of the display.

DETAILED DESCRIPTION OF THE EMBODIMENTS

In order to make the objections, technical solutions and advantages of the present disclosure more clear and definite, the present disclosure will be further described in detail below with reference to the accompanying drawings and examples. It should be understood that the specific embodiments described herein are only used to explain the present disclosure, but not to limit the present disclosure.

Figure 1:
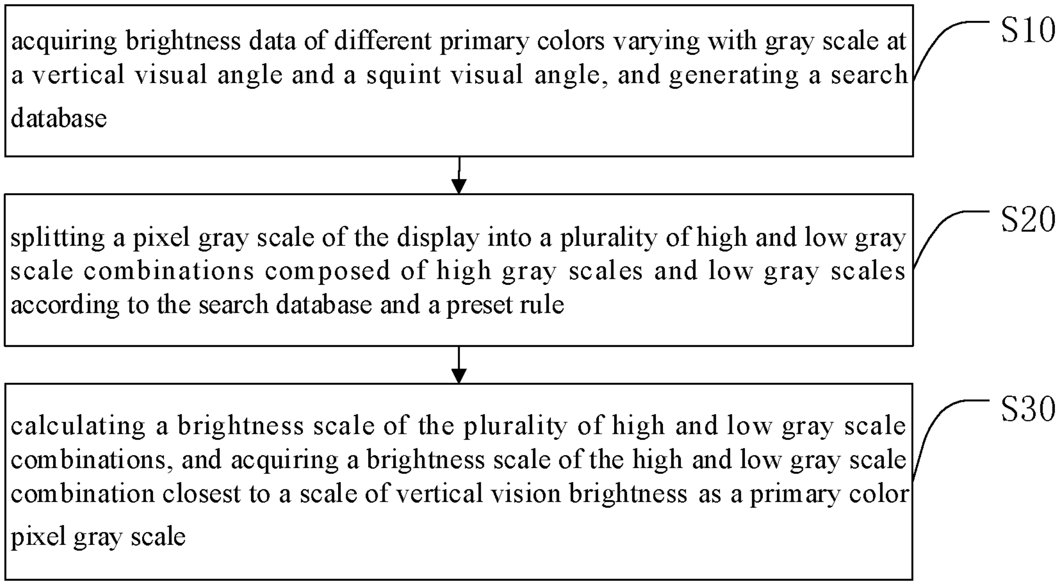
FIG. 1 is a flow chart of a preferred embodiment of a chrominance visual angle correction method for a display of the present disclosure.

A chrominance visual angle correction method for a display according to an embodiment of the present disclosure, as shown in FIG. 1, a chrominance visual angle correction method for a display comprises following steps:

Step S10, acquiring brightness data of different primary colors varying with gray scale at a vertical visual angle and a squint visual angle, and generating a search database.

Specifically, the vertical visual angle is a direction in which a user is facing a display directly (for example, an angle that the user looks at a center of the display, that is, an angle between the user and the center of the display is 0°, and a visual angle at this time is defined as the vertical visual angle), and the squint visual angle is a direction in which there is a preset angle difference between a facing direction of the user and the display. The squint visual angle is a certain squint angle when the user is viewing, and the squint visual angle is relative to vertical vision (that is, the user does not look at the center of the display directly; for example, when a preset range angle is greater than 0° and less than 90°, it is defined as the squint visual angle).

Before the step S10, the method further comprises: acquiring brightness data of primary color pixel gray scales at the vertical visual angle and the squint visual angle separately. For example, the primary color pixel of a television is composed of RGB gray scales, and the gray scale is 0-255. Each gray scale has a corresponding brightness, display of all colors in the television is mixed by these RGB. For example, each pixel on a liquid crystal display (LCD) screen is composed of red, green, and blue of different brightness levels, and finally forms different color points. In other words, color change of each point on the screen is actually caused by a variety of the gray scales of three RGB sub-pixels. RGB has a mixing ratio at the vertical visual angle, but due to factors such as performance and technology of the display itself, a scale of brightness of RGB will change at the squint visual angle, resulting in color deviation.

Specifically, the brightness data of the primary colors (R/G/B) at the vertical visual angle and at the squint visual angle in the gray scale of 0-255 are collected respectively, and the data of the brightness of different primary colors changing with the gray scale at the two visual angles are obtained, which is used as a search database. The search database comprises a database of primary color brightness at the vertical visual angle and a database of primary color brightness at the squint visual angle.

Wherein, the brightness data of the search database can be collected at every preset size gray scale (for example, 2 gray scales), or can be gray scales of other sizes, and numerical search is based on an average value of adjacent gray scale data; or the brightness data of the search database is obtained by acquiring part of the brightness data and performing data fitting. For example, when collecting the brightness data of the primary color (R/G/B) in the 0-255 gray scale, only a part of the gray scale values may be collected, for example, 0 gray scale, 30 gray scale, 60 gray scale, 100 gray scale, 200 gray scale, and 255 gray scale brightness data, and then through data fitting (for example, using an existing two-degree function to perform data fitting or curve fitting), the brightness data of the primary color (R/G/B) in 0-255 gray scale can be obtained in the search database.

Step S20, splitting, according to the search database and preset rule, pixel gray scale of the display into a plurality of high and low gray scale combinations composed of high gray scales and low gray scales.

Wherein, the preset rule is that brightness of a display pixel does not change before and after the gray scale is split; wherein, a meaning of a display pixel gray scale is that each pixel of the display is composed of three primary color gray scales of R/G/B. R is red (0-255 gray scale), G is green (0-255 gray scale), and B is blue (0-255 gray scale). Different colors are generated by mixing three colors RGB, such as the RGB gray scale of a white screen is 255/255/255.

Specifically, the search database as known above comprises the primary color database of brightness at the vertical visual angle and the primary color database of brightness at the squint visual angle. According to the primary color database of brightness at the vertical visual angle and the brightness of the pixel gray scale of the display remaining unchanged before and after splitting (that is, a sum of the brightness of a combination of high and low gray scales is equal to a brightness of the gray scale which is not split), split the pixel gray scale of the display into a plurality of high and low gray scale combinations composed of high gray scales and low gray scales. Wherein, each of the high and low gray scale combinations comprises the high gray scale and the low gray scale, and a reason for splitting into two gray scales is that the split two gray scales has already sacrificed half of pixel resolution. If it is split into a plurality of (more than two) gray scales, the pixel resolution will be too low; and the sum of the brightness of the high gray scale and the low gray scale in each of the high and low gray scale combinations is same as the brightness of the pixel gray scale of the display.

For example, splitting the original gray scale with RGB (200/200/200) into two pixels with gray scales (100/150/50) and (150/100/200), regarding the primary color gray scale, such as 100 gray scale, split into 101 and 99, then this 101 is the high gray scale, and 99 is the low gray scale.

The pixel primary color gray scale of the display is split into two gray scales (the high gray scale and the low gray scale), and the brightness remains unchanged before and after splitting; a gray scale splitting rule can be that the gray scale value is successively added with a preset value (such as a preset value of 1 or other values) to split.

Step S30: Calculating a scale of brightness of the plurality of high and low gray scale combinations, and acquiring a high and low gray scale combination that is closest to a scale of vertical visual of brightness as the primary color pixel gray scale.

Specifically, the search database as known above comprises the primary color database of brightness at the vertical visual angle and the primary color database of brightness at the squint visual angle. The scale of brightness of the plurality of combinations of high and low gray scales according to the primary color database of brightness at the squint visual angle can be calculated. Wherein, the scale of brightness is a scale of the scale of brightness R/G/B at the vertical visual angle before splitting to the sum of brightness of the high and low gray scale R/G/B at the squint visual angle after splitting. For example, the primary color pixel RGB has a brightness at the vertical visual angle, and RGB has a scale of brightness. After splitting, at the squint visual angle, the sum of brightness of the split RGB ($R1=R_{high}+R_{low}$; $G1=G_{high}+G_{low}$; $B1=B_{high}+B_{low}$) R1G1B1 also has a scale of brightness. Acquiring a high and low gray scale combination which is closest to the scale of vertical visual brightness among the plurality of high and low gray scale combinations as the primary color pixel gray scale; and writing the primary color pixel gray to the display.

For example, the brightness of the television gradually decreases with a change of the visual angles, and brightness decreases when viewed from a side. At the vertical visual angle (0°), different RGB gray scales have different brightness. For example, before splitting, R has a brightness, G has a brightness, and B has a brightness, and these have a scale of brightness. At the squint visual angle (such as 20°, or 30°, or 40°), the RGB brightness decreases, and R/G/B also have their own brightness and a scale of brightness. Color changes when viewing at an angle, which is caused by inconsistent scale of brightness.

Splitting the primary color RGB gray scale into the plurality of high and low gray scale combinations (the sum of the brightness of the high and low combinations is equal to the brightness of the gray scale that is not split), sums of the brightness of these high and low gray scale combinations are equal at the vertical visual angle. The scales of brightness of RGB are also same. But the sums of the brightness of these combinations and the scales of brightness of RGB changes at the squint visual angle, therefore, acquire a high and low gray scale combination the scale of brightness closest to the scale of vertical visual brightness in the plurality of high and low gray scale combinations as the primary color pixel grayscale (that is, finding a group where the scale of brightness of the sum of brightness of the split group is closest to the vertical visual angle scale).

Wherein, the display comprises but is not limited to LCD, organic light emitting display (OLED), quantum-dot light emitting display (QLED), micro-LED and other display devices.

The present disclosure improves the chrominance visual angle of the display. Under a condition of not changing viewing effect of the vertical visual angle, splitting the R/G/B pixels according to a principle of equal scale of R/G/B brightness at the vertical visual angle and the squint visual angle, so as to realize an improvement of the chrominance visual angle, which can greatly increase the chrominance visual angle of the display panel, thereby increasing the viewing effect. Because the visual angle increased, the viewing range also increased. For example, previously, the visual angle is only 20 degrees, and the viewing effect is very poor when viewing in a range of more than 20 degrees.

Further, in order to illustrate the chrominance visual angle correction method for the display of the present disclosure, two specific examples are described below.

Example 1: The vertical visual angle (0°) and the squint visual angle (20°) of picture 1 (RGB: 115 gray scale/87 gray scale/74 gray scale, each pixel of the display is composed of RGB primary color gray scale, and different gray scales have different brightness) are tested with equal scale of R/G/B brightness to improve the visual angle.

First, collect brightness data of primary colors (R/G/B) at 0° visual angle and 20° visual angle at 0-255 gray scales by using CA310 (a type of color analyzer) and obtain brightness data of different primary colors varying with gray scale at two visual angles, and use it as a search database.

Secondly, cyclically add one to the primary color 115/87/74 gray scale of the 0° visual angle and the obtained gray scale is used as a split high gray scale; search the 0° visual angle database (that is, the vertical visual angle primary color database of brightness) according to the brightness not changed before and after split; find a corresponding split low gray scale; and obtain all split gray scale combinations.

Furthermore, traverse and search for the scale of the sum of the brightness of all the split R/G/B gray scale combinations in the 20° visual angle database (primary color database of brightness at the squint visual angle), and find the split combination closest to the scale of brightness of R/G/B at 0° visual angle.

Figure 2:
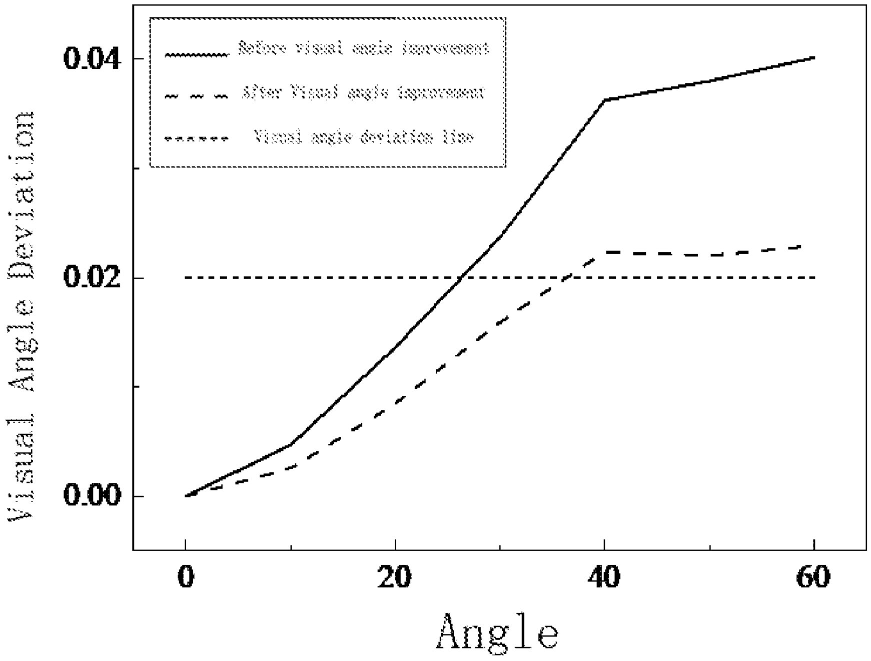
FIG. 2 is a schematic diagram of contrast (picture 1) before and after a chrominance visual improvement in a preferred embodiment of the chrominance visual angle correction method for the display of the present disclosure.

Finally, write the found split combinations into the display and measure the chrominance visual angle. The measurement results of the chrominance visual angles are shown in FIG. 2, wherein abscissa is a rotation angle (angle) of the display, and ordinate is a chrominance deviation (visual deviation). As shown in FIG. 2, after adopting this visual angle processing method, the chrominance visual angle of the display has significantly improved.

Figure 3:
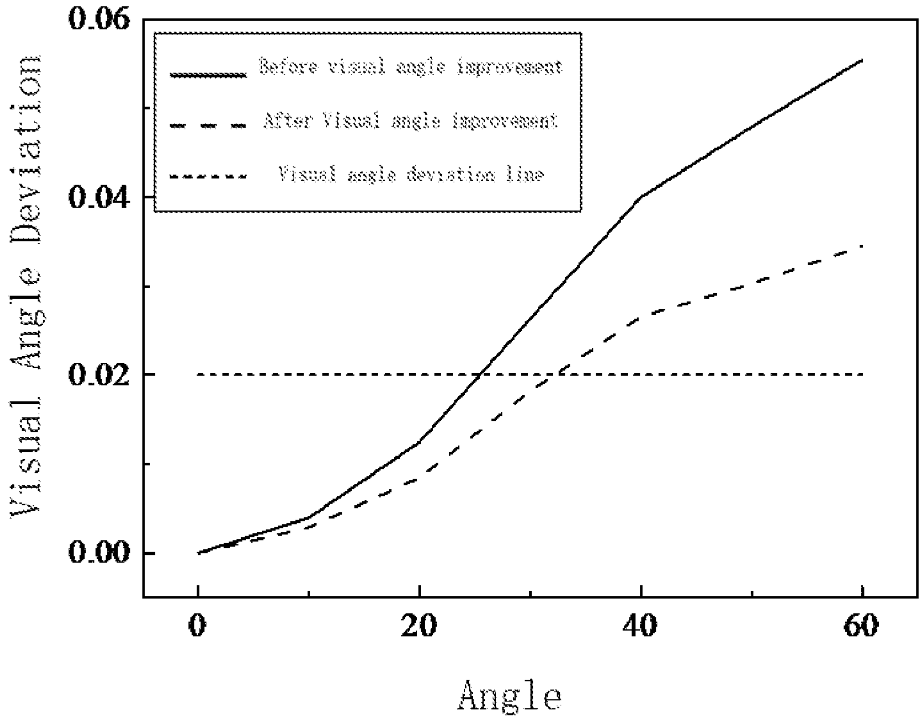
FIG. 3 is a schematic diagram of contrast (picture 2, gray scale values of picture 2 and picture 1 are different) before and after a chrominance visual improvement in a preferred embodiment of the chrominance visual angle correction method for the display of the present disclosure.

Example 2: example 2 is to process 9 patterns (RGB gray scale) of the National Standard according to steps of Example 1, obtain a best split gray scale of the 9 patterns, generate a table that can be recognized by a movement, and write it into the display and perform interpolation mapping, measure the chrominance visual angle of picture 2 (RGB: 76 gray scale/143 gray scale/79 gray scale). The measurement results of the chrominance visual angles are shown in FIG. 3. As shown in FIG. 3, after adopting this visual angle processing method, the chrominance visual angle of the display is significantly improved.

Specifically, 9 solid-color pictures of the national standard are selected, that is, chrominance visual angles of the 9 patterns are measured, and the 9 patterns are split to improve the visual angles of the 9 patterns. There are many gray scale combinations in non-solid color pictures, all of which are calculated, and the amount of data is large; another method is to select some gray scales to calculate, and then generate a table, and other gray scales can be interpolated. Then generate a table and write it into the display (such as a television), if other gray scales are encountered, they can be directly differentiated, and it is not necessary to calculate the other gray scales one by one.

Figure 4:
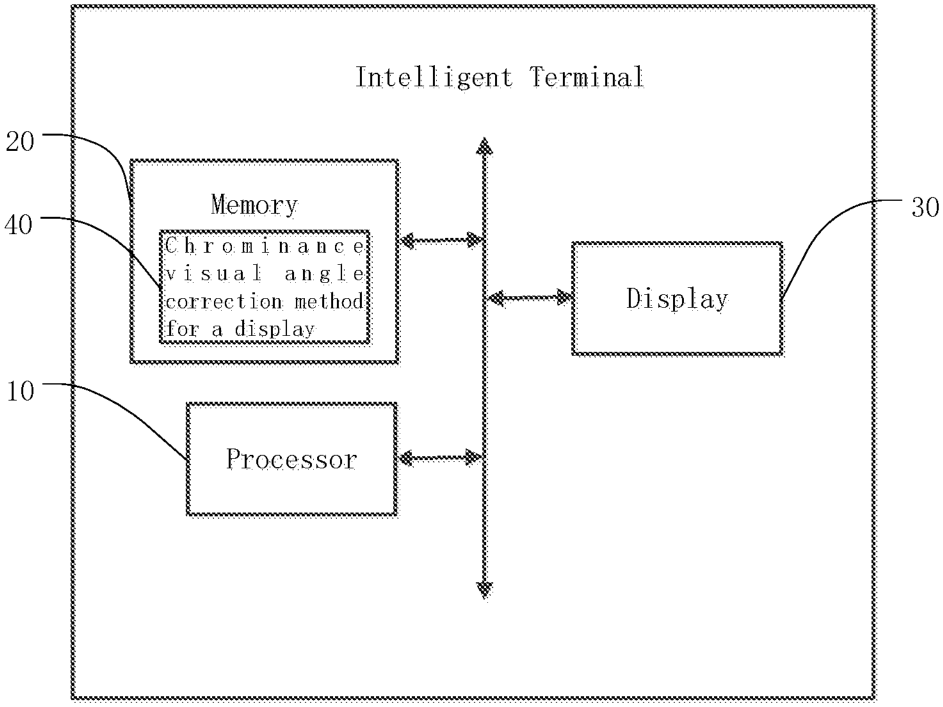
FIG. 4 is a schematic diagram of an operating environment of a preferred embodiment of an intelligent terminal.

Further, as shown in FIG. 4, based on the chrominance visual angle correction method for the display, the present disclosure also provides an intelligent terminal correspondingly, the intelligent terminal comprises a processor 10, a memory 20, and a display 30. Only some components of the intelligent terminal are shown in FIG. 4, but it should be understood that it is not required to implement all the shown components, and more or less components may be implemented instead.

In some embodiments, the memory 20 can be an internal storage unit of the intelligent terminal, such as a hard disk or a memory of the intelligent terminal. In other embodiments, the memory 20 can also be an external storage device of the intelligent terminal, such as a plug-in hard disk, a SMARTMEDIA card (SMC), a SECURE DIGITAL card (SD), a flash card, etc., equipped on the intelligent terminal. Further, the memory 20 also comprises both an internal storage unit of the intelligent terminal and an external storage device. The memory 20 is used to store application software and various types of data installed in the intelligent terminal, such as program codes for installing the intelligent terminal. The memory 20 can also be used to temporarily store data that has been output or is to be output. In one embodiment, a chrominance visual angle correction program 40 for the display is stored in the memory 20, and the chrominance visual angle correction program 40 for the display can be executed by the processor 10 to implement the chrominance visual angle correction method for the display in the present application.

In some embodiments, the processor 10 can be a central processing unit (CPU), a microprocessor, or other data processing chips, which are used to execute program codes or process data stored in the memory 20, such as used to execute the chrominance visual angle correction method for the display and the like.

In some embodiments, the display 30 can be an LED display, a liquid crystal display, a touch-sensitive liquid crystal display, an organic light-emitting diode (OLED) touch device, and the like. The display 30 is used for displaying information on the intelligent terminal and for displaying a visual user interface. The components 10-30 of the intelligent terminal communicate with each other through a system bus.

In one embodiment, when the processor 10 executes the chrominance visual angle correction program 40 for the display in the memory 20, following steps are implemented:

acquiring brightness data of different primary colors varying with a gray scale at a vertical visual angle and a squint visual angle, and generating a search database;

Splitting a pixel gray scale of the display into a plurality of high and low gray scale combinations composed of high gray scales and low gray scales according to the search database and a preset rule; and calculating a scale of brightness of the plurality of high and low gray scale combinations, and acquiring a high and low gray scale combination that is closest to a scale of vertical vision of brightness as the primary color pixel gray scale.

Before the step of acquiring brightness the data of the brightness of different primary colors varying with gray scale at the vertical visual angle and the squint visual angle, and generating the search database, the method further comprises:

acquiring brightness data of primary color pixel gray at the vertical visual angle and the squint visual angle separately; the vertical visual angle is a direction in which the user and the display are facing directly, and the squint visual angle is a direction in which there is a preset angle difference between a facing direction of the user and the display.

The search database comprises a database of brightness of primary color at the vertical visual angle and the database of the brightness of primary color at the squint visual angle.

The preset rule is that brightness of the pixel gray scale of the display does not change before splitting and after splitting.

According to the search database and the preset rule, splitting the pixel gray scale of the display into the plurality of high and low gray scale combinations composed of high gray scales and low gray scales, the method specifically comprises:

splitting the pixel gray scale of the display into the plurality of high and low gray scale combinations composed of the high gray scales and the low gray scales according to the database of the brightness of primary color at the vertical visual and the brightness of the pixel gray scale of the display unchanged before splitting and after splitting;

each of the high and low gray scale combinations comprising one high gray scale and one low gray scale; and the sum of the brightness of the high gray scale and the low gray scale in each of the and high and low gray scale combination is same as the brightness of the pixel gray scale of the display.

The pixel gray scale of the display indicates that each pixel of the display is composed of three primary color gray scales of R/G/B.

Splitting rule of the gray scale comprises gradually adding a preset value to the gray scale value for splitting.

Calculating the scales of brightness of the plurality of high and low gray scale combinations, and acquiring the scale of brightness of the high and low gray scale combination closest to the scale of vertical visual brightness as the primary color pixel gray scale, the method specifically comprises:

calculating the scale of brightness of the plurality of the high and low gray scale combination according to the database of the primary color brightness of squint visual angle acquiring the high and low gray scale combination that is closest to the scale of vertical visual brightness among the plurality of the high and low gray scale combinations as the primary color pixel gray scale; and writing the primary color pixel gray scale into the display.

The sum of the brightness of the high and low gray scale combinations is equal at the vertical visual angle, and the scale of brightness of RGB is equal, and the sum of the brightness of the high and low gray scale combinations and the scale of brightness of RGB changes at the squint visual angle.

The scale of brightness is the ratio of the scale of brightness R/G/B at the vertical visual angle before splitting to the sum of brightness of the high and low gray scale R/G/B at the squint visual angle after splitting.

The chrominance visual angle correction method for the display further comprises:

the brightness data of the search database is collected at every preset size of the gray scale; or the brightness data of the search database is obtained by acquiring part of the brightness data and performing data fitting.

When the preset angle difference is greater than 0° and less than 90°, it is defined as the squint visual angle.

The display comprises: LCD, OLED, QLED and micro-LED.

The present disclosure also provides a storage medium. Wherein, the storage medium stores the chrominance visual angle correction method for the display, and the chrominance visual angle correction method is executed by the processor to implement the steps of the chrominance visual angle correction method as described above.

In summary, the present disclosure provides the chrominance visual angle correction method for the display, the intelligent terminal, and the storage medium. The method comprises: acquiring brightness data of different primary colors varying with the gray scale at the vertical visual angle and the squint visual angle, and generating the search database; splitting, according to the search database and the preset rule, the pixel gray scale of the display into the plurality of high and low gray scale combinations composed of high gray scales and low gray scales; and calculating the scale of brightness of the plurality of high and low gray scale combinations, and acquiring the scale of brightness of the high and low gray scale combination closest to the scale of vertical vision brightness as the primary color pixel gray scale. By making primary colors have the same scale of brightness at the vertical visual angle and the squint visual angle, the chrominance visual angle of the display is improved, such that the squint visual angle can be improved without changing the performance at the vertical visual angle, thereby greatly improving the viewing effect of the display at the squint visual angle, and facilitating a large-visual-angle application scenario of the display.

Of course, those of ordinary skill in the art can understand that all or part of the processes in the methods of the above embodiments can be implemented by instructing relevant hardware (such as processors, controllers, etc.) through a computer program, and the programs can be stored in a computer-readable storage medium. When the program is executed, it can comprise the processes of the foregoing method embodiments. The storage medium can be a memory, a magnetic disk, an optical disk, or the like.

It should be understood that the application of the present disclosure is not limited to the above examples, and those of ordinary skill in the art can make improvements or transformations according to the above descriptions, and all these improvements and transformations should belong to the protection scope of the appended claims of the present disclosure.

What is claimed is:

1. A chrominance visual angle correction method for a display, comprising:

acquiring brightness data of primary colors Red (R), Green (G), and Blue (B) varying with gray scales at a vertical visual angle and at an oblique visual angle respectively, and generating a search database based on the brightness data;

splitting a pixel gray scale of the display into a plurality of high and low gray scale combinations according to the search database and a preset rule, wherein each of the plurality of high and low gray scale combinations comprises a first high gray scale and a first low gray scale corresponding to R, a second high gray scale and a second low gray scale corresponding to G, and a third high gray scale and a third low gray scale corresponding to B;

calculating a first ratio of brightness of R gray scale, brightness of G gray scale and brightness of B gray scale at the vertical visual angle before the splitting, and second ratios respectively corresponding to the plurality of high and low gray scale combinations at the oblique visual angle, wherein each of the second ratios is equal to a ratio of a sum of brightness of the first high gray scale and brightness of the first low gray scale, a sum of brightness of the second high gray scale and brightness of the second low gray scale, and a sum of brightness of the third high gray scale and brightness of the third low gray scale for one of the plurality of high and low gray scale combinations at the oblique visual angle; and determining one of the second ratios closest to the first ratio, and determining one of the plurality of high and low gray scale combinations corresponding to the one of the second ratios as a primary color pixel gray scale.

2. The chrominance visual angle correction method for the display according to claim 1, wherein the vertical visual angle corresponds to a first direction in which a user directly faces the display, and the oblique visual angle corresponds to a second direction with a preset angle difference from the first direction of the user and the display.

3. The chrominance visual angle correction method for the display according to claim 1, wherein the search database comprises a first database of brightness of the primary colors at the vertical visual angle and a second database of the brightness of the primary colors at the squint visual angle; and the generating of the search database comprises:

collecting and storing the brightness data of the primary colors at the vertical visual angle in a gray scale range of 0-255 to generate the first;

collecting and storing the brightness data of the primary colors at the oblique visual angle in the gray scale range of 0-255 to generate the second.

4. The chrominance visual angle correction method for the display according to claim 3, wherein the preset rule is that the brightness of the pixel gray scale of the display before the splitting and after the splitting is same.

5. The chrominance visual angle correction method for the display according to claim 4, wherein the splitting of the pixel gray scale of the display into the plurality of high and low gray scale combinations according to the search database and the preset rule comprises:

splitting the pixel gray scale of the display into the plurality of high and low gray scale combinations according to the first database and the preset rule that the brightness of the pixel gray scale of the display before the splitting and after the splitting is same, so that for each of the primary colors, a sum of brightness of a high gray scale and brightness of a low gray scale in each of the high and low gray scale combinations is same as brightness of the pixel gray scale of the display.

6. The chrominance visual angle correction method for the display according to claim 5, wherein the pixel gray scale of the display indicates that each pixel of the display is composed of gray scales of the primary colors R, G, and B.

7. The chrominance visual angle correction method for the display according to claim 5, wherein a splitting rule of the pixel gray scale comprises gradually adding a preset value to a gray scale value for splitting.

8. The chrominance visual angle correction method for the display according to claim 5, wherein the second ratios are calculated according to the second database, the method further comprises:

writing the primary color pixel gray scale into the display.

9. The chrominance visual angle correction method for the display according to claim 8, wherein at the vertical visual angle, the sum of the brightness of the high gray scale and the brightness of the low gray scale in each of the high and low gray scale combinations is same, and a ratio of the brightness of R gray scale, the brightness of G gray scale and the brightness of B gray scale is same; and at the oblique visual angle, the sum of the brightness of the high gray scale and the brightness of the low gray scale in each of the high and low gray scale combinations changes, and the ratio of the brightness of R gray scale, the brightness of G gray scale and the brightness of B gray scale changes.

10. The chrominance visual angle correction method for the display according to claim 1, wherein the brightness data of the search database is collected at every preset size of the gray scale; or the brightness data of the search database is obtained by acquiring part of the brightness data and performing data fitting.

11. The chrominance visual angle correction method for the display according to claim 2, wherein the preset angle difference is greater than 0° and less than 90°.

12. The chrominance visual angle correction method for the display according to claim 1, wherein the display comprises: a light crystal display (LCD), an organic light emitting diode (OLED) display, a quantum-dot light emitting diode (QLED) display, or a micro-light emitting diode (micro-LED) display.

13. An intelligent terminal, wherein the intelligent terminal comprises: a memory, a processor, and a chrominance visual angle correction program for a display that is stored in the memory and executable by the processor, to perform operations comprising:

acquiring brightness data of primary colors Red (R), Green (G), and Blue (B) varying with gray scales at a vertical visual angle and at an oblique visual angle respectively, and generating a search database based on the brightness data;

splitting a pixel gray scale of the display into a plurality of high and low gray scale combinations according to the search database and a preset rule, wherein each of the plurality of high and low gray scale combinations comprises a first high gray scale and a first low gray scale corresponding to R, a second high gray scale and a second low gray scale corresponding to G, and a third high gray scale and a third low gray scale corresponding to B;

calculating a first ratio of brightness of R gray scale, brightness of G gray scale and brightness of B gray scale at the vertical visual angle before the splitting, and second ratios respectively corresponding to the plurality of high and low gray scale combinations at the oblique visual angle, wherein each of the second ratios is equal to a ratio of a sum of brightness of the first high gray scale and brightness of the first low gray scale, a sum of brightness of the second high gray scale and brightness of the second low gray scale, and a sum of brightness of the third high gray scale and brightness of the third low gray scale for one of the plurality of high and low gray scale combinations at the oblique visual angle; and determining one of the second ratios closest to the first ratio, and determining one of the plurality of high and low gray scale combinations corresponding to the one of the second ratios as a primary color pixel gray scale.

14. A non-transitory storage medium, wherein the storage medium stores a chrominance visual angle correction program for a display executable by a processor to perform operations comprising:

acquiring brightness data of primary colors Red (R), Green (G), and Blue (B) varying with gray scales at a vertical visual angle and at an oblique visual angle respectively, and generating a search database based on the brightness data;

splitting a pixel gray scale of the display into a plurality of high and low gray scale combinations according to the search database and a preset rule, wherein each of the plurality of high and low gray scale combinations comprises a first high gray scale and a first low gray scale corresponding to R, a second high gray scale and a second low gray scale corresponding to G, and a third high gray scale and a third low gray scale corresponding to B;

calculating a first ratio of brightness of R gray scale, brightness of G gray scale and brightness of B gray scale at the vertical visual angle before the splitting, and second ratios respectively corresponding to the plurality of high and low gray scale combinations at the oblique visual angle, wherein each of the second ratios is equal to a ratio of a sum of brightness of the first high gray scale and brightness of the first low gray scale, a sum of brightness of the second high gray scale and brightness of the second low gray scale, and a sum of brightness of the third high gray scale and brightness of the third low gray scale for one of the plurality of high and low gray scale combinations at the oblique visual angle; and determining one of the second ratios closest to the first ratio, and determining one of the plurality of high and low gray scale combinations corresponding to the one of the second ratios as a primary color pixel gray scale.

* * * * *